US012083556B2

(12) United States Patent
Patil et al.

(10) Patent No.: US 12,083,556 B2
(45) Date of Patent: Sep. 10, 2024

(54) ACOUSTIC FORCE ASSISTED PAINTING SYSTEM

(71) Applicant: NISSAN NORTH AMERICA, INC., Franklin, TN (US)

(72) Inventors: Sandeep Patil, Farmington Hills, MI (US); Nanzhu Zhao, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 635 days.

(21) Appl. No.: 17/129,622

(22) Filed: Dec. 21, 2020

(65) Prior Publication Data

US 2022/0193721 A1 Jun. 23, 2022

(51) Int. Cl.

| | |
|---|---|
| ***B05D 3/12*** | (2006.01) |
| ***B05B 7/00*** | (2006.01) |
| ***B05B 7/08*** | (2006.01) |
| ***B05B 12/08*** | (2006.01) |
| ***B05D 5/00*** | (2006.01) |
| ***B06B 1/02*** | (2006.01) |

(52) U.S. Cl.

CPC .............. *B05D 3/12* (2013.01); *B05B 7/0012* (2013.01); *B05B 7/0884* (2013.01); *B05B 12/082* (2013.01); *B06B 1/0292* (2013.01); *B05D 5/00* (2013.01)

(58) Field of Classification Search

CPC .......... B05D 5/00; B05D 3/12; B06B 1/0292; B05B 12/082; B05B 12/18; B05B 7/0012; B05B 7/0884; B05B 17/0607

See application file for complete search history.

(56) References Cited

U.S. PATENT DOCUMENTS

| | | | | |
|---|---|---|---|---|
| 8,501,055 | B2 * | 8/2013 | Ohtani | B05B 17/0646 264/9 |
| 8,539,840 | B2 | 9/2013 | Ariessohn et al. | |
| 8,578,973 | B2 * | 11/2013 | Dillon | B65B 1/16 141/69 |
| 8,758,973 | B2 * | 6/2014 | Makabe | B05B 17/0646 430/137.1 |
| 10,214,013 | B2 | 2/2019 | Foresti et al. | |
| 2006/0210909 | A1 * | 9/2006 | Ohtani | B01J 2/04 430/105 |
| 2019/0160813 | A1 | 5/2019 | Foresti et al. | |
| 2019/0232318 | A1 * | 8/2019 | Liu | B05B 17/063 |

* cited by examiner

*Primary Examiner* — Christopher R Dandridge

(74) *Attorney, Agent, or Firm* — Global IP Counselors, LLP

(57) ABSTRACT

An acoustic force assisted painting system has a housing, at least one nozzle and at least one acoustic emitter. The housing has a conduit for receiving paint from an external source into the housing. The at least one nozzle is disposed in the housing. The at least one nozzle has an inlet that is fluidly connected to the conduit to receive paint from the conduit. The at least one nozzle has an outlet that dispenses paint. The least one acoustic emitter is disposed in the housing at a location downstream of the inlet with respect to the conduit.

14 Claims, 12 Drawing Sheets

ACOUSTIC FORCE ASSISTED PAINTING SYSTEM

BACKGROUND

Field of the Invention

The present invention generally relates to an acoustic force assisted painting system. More specifically, the present invention relates to an acoustic force assisted painting system for applying paint to a vehicle body.

Background Information

Vehicle paints are typically applied using rotary atomizers that include a rotating bell cup having a generally conical overflow surface that opens to an atomizing edge, The paint that is dispensed from rotary atomizers tends to be tortuous and non-uniform as the atomizing process results in a turbulent path of the paint droplets. Conventional rotary bell atomizers cannot handle high low-shear viscosity paint fluid. Thus, current commercial paint has to contain about 50% of solvent which requires drying through a baking process, Additionally, the atomizing process tends to result in waste and it is difficult to utilize for customizations and application of multi-tone paint.

SUMMARY

In view of the state of the known technology, one aspect of the present disclosure is to provide an acoustic force assisted painting system comprising a housing, at least one nozzle and at least one acoustic emitter. The housing has a conduit for receiving paint from an external source into the housing. The at least one nozzle is disposed in the housing. The at least one nozzle has an inlet that is fluidly connected to the paint reservoir to receive paint from the conduit. The at least one nozzle has an outlet that dispenses paint. The least one acoustic emitter is disposed in the housing at a location downstream of the inlet with respect to the conduit.

BRIEF DESCRIPTION OF THE DRAWINGS

Referring now to the attached drawings which form a part of this original disclosure.

DETAILED DESCRIPTION OF EMBODIMENTS

Figure 1:
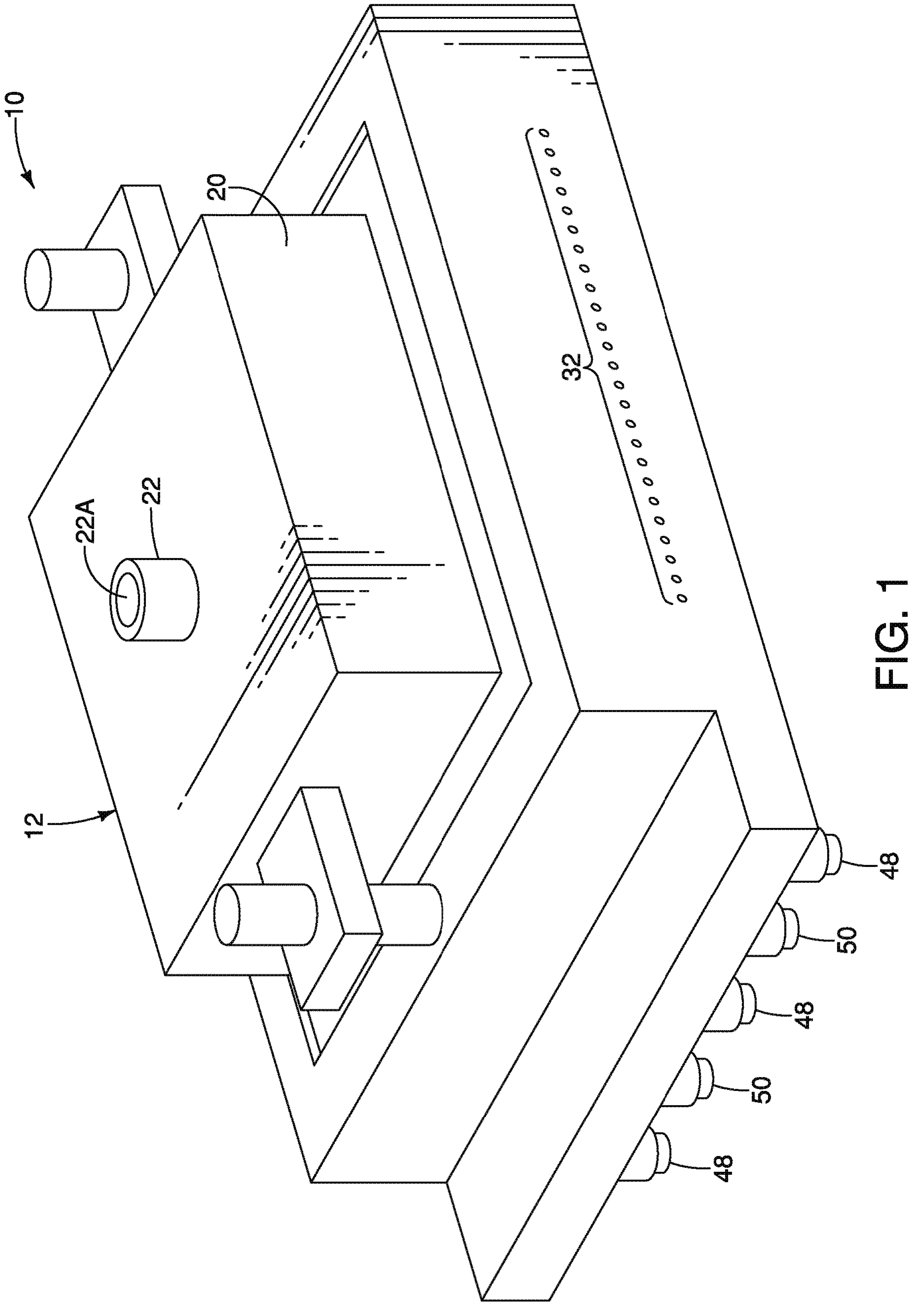
FIG. 1 is a perspective view of a housing for acoustic force assisted painting system in accordance with an illustrated embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 5, an acoustic force assisted painting system 10 is illustrated in accordance with an embodiment. The acoustic force assisted painting system 10 of the illustrated embodiment can be utilized for painting materials, such as a vehicle body. The acoustic force assisted painting system 10 comprises a housing 12, at least one nozzle 14 and at least one acoustic emitter 16. In the illustrated embodiment, the housing 12 houses a plurality of nozzles 14 and a plurality of acoustic emitters 16. Here, the acoustic emitters 16 includes a plurality of acoustic transducers 18 that emit acoustic forces. Therefore, the housing 12 includes a plurality of acoustic transducers 18. In other words, the acoustic force assisted painting system 10 of FIGS. 1 to 5 includes the plurality of nozzles 14 and the plurality of transducers 18. The acoustic force assisted painting system 10 is a multi-nozzle 14 system for paint application to a vehicle body.

In the illustrated embodiment, the term "paint" will refer to any material including, but not limited to, one or more of the following substances: traditional paint, ink, polymers, water, solvents, and other fluids imparting color to a substrate and mixtures of the above-mentioned substances. "Paint" can also refer to material(s) having viscosities significantly higher and significantly lower than traditional paint viscosities.

Figure 3:
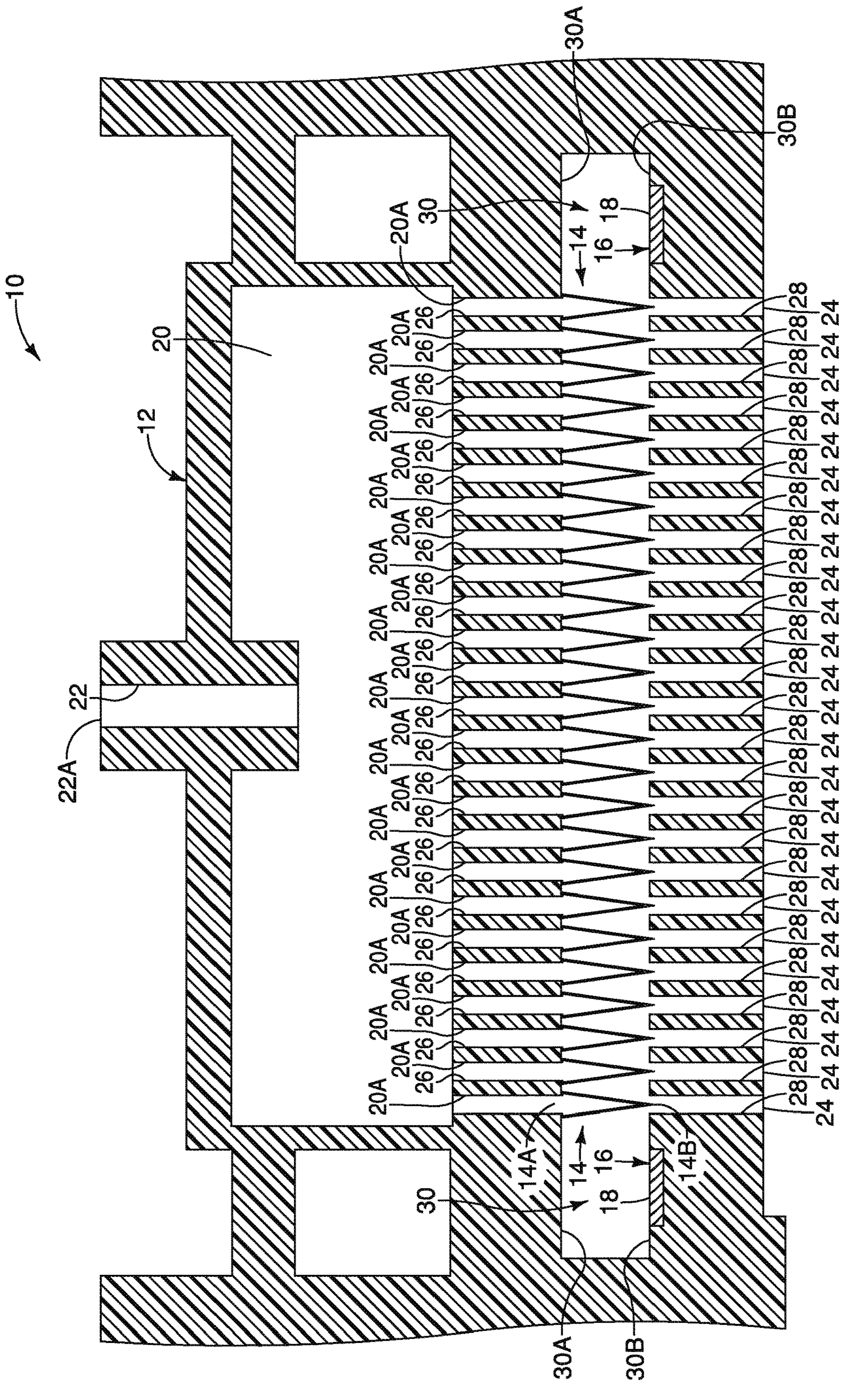
FIG. 3 is a cross-sectional view of the housing of FIGS. 1 and 2.
Figure 4:
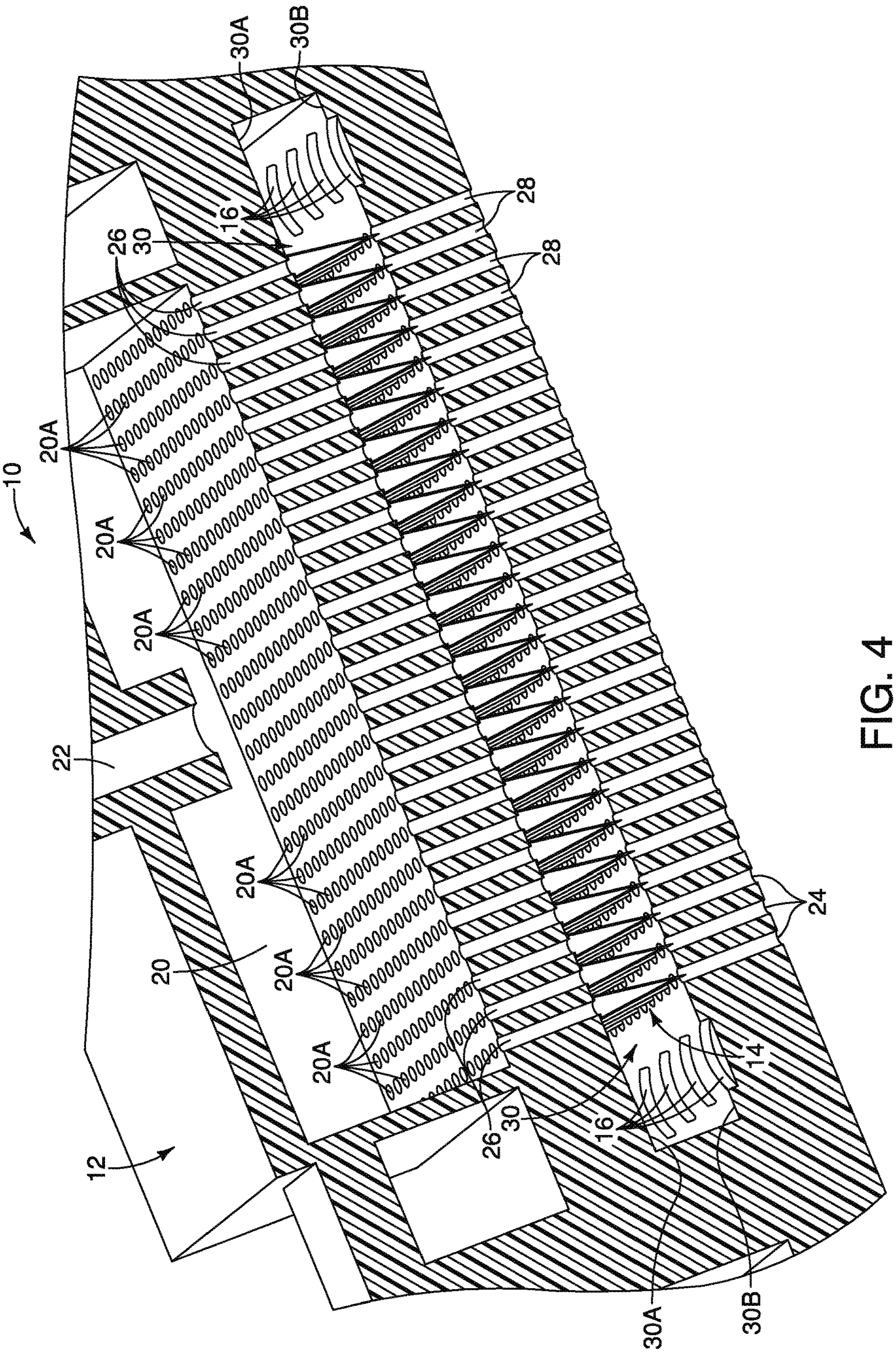
FIG. 4 is another cross-sectional view of the housing of FIGS. 1 to 3.

Referring to FIGS. 3 and 4, the housing 12 includes a reservoir 20 for storing paint. The housing 12 includes a conduit 22 that fluidly receives paint from an external source (not shown) to be stored in the reservoir 20. The conduit 22 fluidly connects the reservoir 20 with the external source to receive paint into the housing 12. The conduit 22 includes an opening that defines an inlet 22A that can be considered an inlet 22A for the housing 12. While the housing 12 is illustrated as being provided the reservoir 20 therein, it will be apparent to those skilled in the vehicle field from this disclosure that the housing 12 can be modified such that the conduit 22 connects directly to the nozzles 14. That is, it will be apparent to those skilled in the vehicle field from this disclosure that the housing 12 does not need to include the reservoir 20. Rather, a reservoir can be provided separately from the housing 12 to deliver paint into the housing 12. Therefore, it will be apparent to those skilled in the vehicle field from this disclosure that the acoustic force assisted painting system 10 can include a reservoir that is separately provided from the housing 12.

Figure 2:
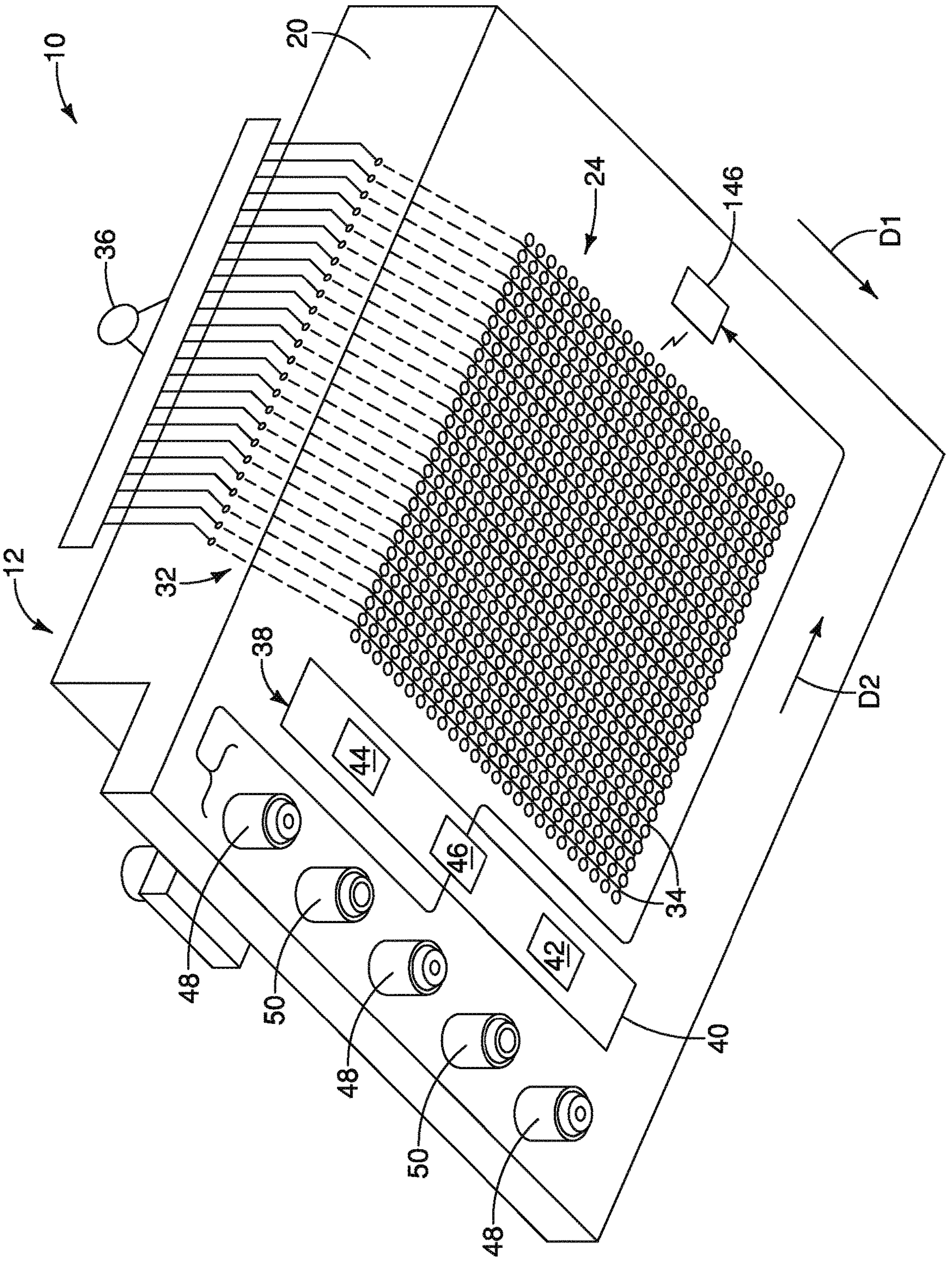
FIG. 2 is a perspective view of an underside of the housing of FIG. 1.

As seen in FIG. 2, the housing 12 includes a plurality of outlets 24 positioned at an underside surface that is opposite side on the housing 12 with respect to the conduit 22. The paint is dispensed from the outlets 24 to be applied to the vehicle body. In the illustrated embodiment, each of the outlets 24 of the housing 12 correspond to one of the nozzles 14. That is, the outlets 24 of the housing 12 receive paint from the nozzles 14 to dispense, as will be further described. While the housing 12 is illustrated as including a single conduit 22 it will be apparent to those skilled in the vehicle field from this disclosure that the housing 12 can include a plurality of conduits 22 for receiving different colors and/or types of paint. Additionally, while the housing 12 is illustrated as including a single reservoir 20 that is fluidly connected to all of the nozzles 14, it will be apparent to those skilled in the vehicle field from this disclosure that the housing 12 can include a plurality of reservoirs 20 for storing different colors and/or types of paint.

As best seen in FIGS. 3 and 4, the reservoir 20 is a space that receives paint from the conduit 22. The reservoir 20 is preferably is small feedstock reservoir that does not carry significant weight to the housing 12. Thus, the reservoir 20 is configured to continuously receive paint from the conduit 22 during use of the acoustic force assisted painting system 10. The reservoir 20 includes a plurality openings 20A that extend into a plurality of first channels 26. The first channels 26 extend between the reservoir 20 and the nozzles 14 to fluidly connect the nozzles 14 with the reservoir 20. That is, the first channels 26 are fluidly connected to the reservoir 20 to receive paint from the reservoir 20. The first channels 26 are fluidly connected to the nozzles 14 so that paint flows from the reservoir 20 to the nozzles 14. The housing 12 further includes a plurality of second channels 28 that receive paint from the nozzles 14. The second channels 28 include the outlets 24 of the housing 12 that open to the exterior. Therefore, the second channels 28 are fluidly connected to the nozzles 14 to receive paint from the reservoir 20.

Figure 5:
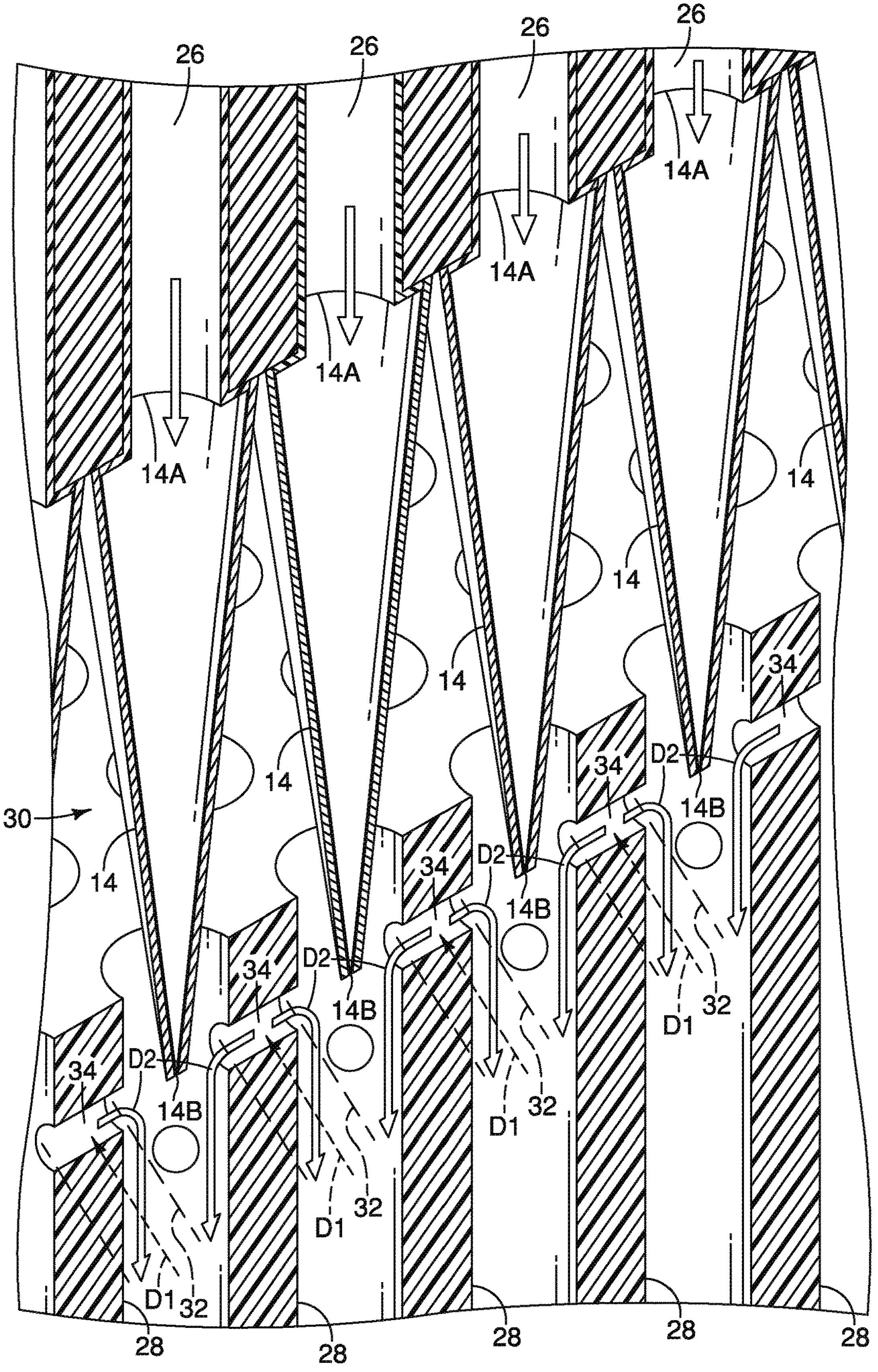
FIG. 5 is an enlarged cross-sectional view of a portion of the housing of FIGS. 1 to 4.

Thus, the nozzles 14 are fluidly connected to the reservoir 20 and the outlets 24 of the housing 12. That is, the nozzles 14 fluidly connect the reservoir 20 with the outlets 24 of the housing 12 to dispense the paint. As seen in FIGS. 3 to 5, each of the nozzles 14 has an inlet 14A and an outlet 14B. The inlets 14A of the nozzles 14 are fluidly connected to the reservoir 20 via the first channels 26 to receive paint from the reservoir 20. Each of the outlets 14B of the nozzles 14 dispenses paint into respective ones of the second channels 28 that lead to the outlets 24 of the housing 12.

The housing 12 further includes an acoustic chamber 30 that houses the transducers 18. In other words, the transducers 18 are disposed in the acoustic chamber 30. The acoustic chamber 30 is positioned between the reservoir 20 and the second channels 28. Therefore, the transducers 18 are positioned between the reservoir 20 and the second channels 28. The nozzles 14 extend through the acoustic chamber 30 and are primarily disposed in the acoustic chamber 30 but extend partially in the second channels 28. In particular, the outlets 14B of the nozzles 14 are disposed in the second channels 28.

In the illustrated embodiment, as best seen in FIG. 4, the housing 12 includes a first row 18A of acoustic emitters 16 and a second row 18B of acoustic emitters 16 that are disposed on opposite lateral sides of the acoustic chamber 30 with respect to each other. However, it will be apparent to those skilled in the vehicle field from this disclosure that the number and arrangement of transducers 18 that can be implemented with the housing 12 can vary. It will also be apparent to those skilled in the vehicle field from this disclosure that the positions of the transducers 18 within the acoustic chamber 30 can vary Conventional vehicle paint has high viscosity that result in the formation of large-sized paint droplets during application of the paint to the vehicle body. Therefore, the acoustic force assisted painting system 10 of the illustrated embodiment is provided for forming and dispensing uniformly-sized paint droplets from the housing 12 to the vehicle body. The acoustic force assisted painting system 10 is provided to apply continuous pressure of the paint droplets that are dispensed from the housing 12.

In particular, the transducers 18 of the acoustic force assisted painting system 10 are configured emit acoustic forces (e.g., soundwaves) directed at droplets formed at the outlets 14B of the nozzles 14. in this way, the soundwaves emitted by the transducers 18 apply pressure to help detach paint bubbles from the outlets 14B of the nozzles 14 to form droplets that can be uniformly and smoothly applied. In the illustrated embodiment, the acoustic force assisted painting system 10 also utilizes electrostatic/magnetic forces, acoustic threes and air flow forces to help detach the droplets from the nozzles 14. in particular, the nozzles 14 are preferably made of a material capable of conducting electrostatic/magnetic forces that will amplify the effect of the acoustic forces generated by the transducers 18. The housing 12 further includes airflow channels that generate air flow forces that help direct the droplets from the outlets 14B of the nozzles 14 into the second channels 28, as will be described below.

In the illustrated embodiment, a direction of paint flow flows from the conduit 22, to the reservoir 20, to the first channels 26, to the nozzles 14. to the second channels 28, to the outlets 24. That is, the reservoir 20 is upstream of the nozzles 14 and the nozzles 14 are upstream of the outlets 24. In the illustrated embodiment, the acoustic chamber 30 is disposed downstream of the reservoir 20 and upstream of the outlets 24 of the housing 12. As best seen in FIGS. 3 and 4, the acoustic chamber 30 is upstream of the outlets 14B of the nozzles 14. That is, the transducers 18 are preferably upstream of the outlets 14B of the nozzles 14 and downstream of the inlets 14A of the nozzles 14.

However, it will be apparent to those skilled in the vehicle field from this disclosure that the transducers 18 can alternatively be disposed downstream of the outlets 14B of the nozzles 14 to emit acoustic soundwaves towards the outlets 14B. Preferably, the transducers 18 are positioned at a location that is in the vicinity of the outlets 14B of the nozzles 14. That is, the transducers 18 are preferably disposed in the vicinity of the outlets 14B of the nozzles 14 to apply soundwaves to the droplets.

As best seen in FIGS. 1, 2 and 5, the housing 12 includes a first airflow channel 32 and a second airflow channel 34. The first airflow channel 32 extends through the second channels 28 in a first direction D1 to enable external air to flow through the second channels 28 in the first direction D1, as best seen in FIG. 2. As best seen in FIG. 5, the second airflow channel 34 extends through the second channels 28 in a second direction D2 that is transverse to the first direction DI to enable external air to flow in the second direction D2. The first and second airflow channels 32 and 34 are arranged and configured to generate air flow forces to help detach the droplets from the outlets 14B of the nozzles 14. In particular, air flow forces can be directed towards the droplets. Alternatively, as best seen in FIG. 5, air flow can enter the second channels 28 tangentially from the first airflow channel 32 to create a swirling moment at the droplets that have been detached from the outlets 14B.

The first airflow channel 32 opens to the exterior of the housing 12, as shown in FIGS. 1 and 2. As best seen in FIG. 2, the acoustic force assisted painting system 10 further includes an external airflow source, such as an air pump 36. The air pump 36 is in direct communication with the first airflow channel 32 to pump air from the exterior of the housing 12 into the first airflow channel 32. As shown in FIGS. 2 and 5, the first and second airflow channels 32 and 34 are in communication with each other such that air flows from the first airflow channel 32 to the second airflow channel 34.

The second airflow channels 34 intersect with the second channels 28 of the housing 12 to enable airflow from the second airflow channels 34 to the second channels 28. In particular, as best seen in FIG. 5, the second airflow channels 34 intersect with the second channels 28 at a location in the vicinity of the outlets 14B of the nozzles 14 so that air from the second airflow channels 34 is applied to the droplets dispensed from the outlets 14B of the nozzles 14.

In the illustrated embodiment, air flow forces flow from the air pump 36, to the first airflow channels 32, to the second airflow channels 34, to the second channels 28. In this way, air is pumped from the exterior to the second channels 28 to apply airflow forces that will help push the droplets that have been detached from the outlets 14B downward into the second channels 28. Therefore, the air flows through the first and second airflow channels 32 and 34 to apply airflow force to the nozzles 14.

Referring to FIG. 4, the nozzles 14 are arranged in an array of successive rows and columns within the housing 12. As stated, the nozzles 14 can be made of any conducting material that can conduct electricity. Preferably, the nozzles 14 are metallic tubes. Each of the nozzles 14 preferably has the same size and dimension with respect to each other to ensure uniformity of the droplets that are formed. Preferably, the outlets 14B of the nozzles 14 has a size between 1 micron to 500 microns (μm). The droplets formed at the outlets 14B of the nozzles 14 preferably has a size between 1 μm to 500 μm.

It will be apparent to those skilled in the vehicle field from this disclosure that the sizes of the nozzles 14 can vary depending on the intensity of the acoustic forces that are applied to the droplets from the transducers 18. Therefore, the sizes of the nozzles 14 can vary depending on the distance between the nozzles 14 and the transducers 18 and/or the frequency of the soundwaves that are emitted by the transducers 18, Therefore, it will be apparent to those skilled in the vehicle field from this disclosure that the outlets 14B of the nozzles 14 can be larger when the transducers 18 are closer or when the transducers 18 emit a higher frequency. It will also be apparent to those skilled in the vehicle field from this disclosure that the outlets 14B of the nozzles 14 can be smaller when the transducers 18 are farther away or when the transducers 18 emit a lower frequency. That is, it will also be apparent to those skilled in the vehicle field from this disclosure that the transducers 18 can emit different frequencies depending on the size of the housing 12 and/or the acoustic chamber 30. That is, the transducers 18 can emit higher frequencies when the acoustic chamber 30 is larger and the nozzles 14 are more spaced apart.

As stated, the nozzles 14 extend through the acoustic chamber 30. As best seen in FIGS. 3 and 4, the acoustic chamber 30 includes an upstream sidewall 30A and a downstream side wall 30B. The downstream side wall 30B of the acoustic chamber 30 includes the transducers 18 disposed thereon. That is, the transducers 18 are positioned on the downstream side wall 30B. In particular, the transducers 18 are disposed in the housing 12 at a location downstream of the inlet 14A of the nozzles 14 with respect to the reservoir 20. As seen in FIGS. 3 and 4, the transducers 18 are positioned closer to the outlets 14B than to the inlets 14A of the nozzles 14. As best seen in FIG. 5, the transducers 18 are positioned upstream of the outlets 14B at a location within the vicinity of the outlets 14B of the nozzles 14.

Thus, the downstream side wall 30B is positioned closer to respective outlets 14B of the nozzles 14 than to the respective inlets 14A. The downstream side wall 30B of the acoustic chamber 30 includes a plurality of openings. Each of the openings receives one of the outlets 14B of the nozzles 14 therethrough. The openings extend into the second channels 28 that form the outlets 24 of the housing 12. As shown in FIG. 4, the transducers 18 are arranged in successive rows along the acoustic chamber 30. Each of the transducers 18 correspond to one of the successive rows of the nozzles 14.

The acoustic emitters 16 can be plate-like members that are each periodically driven by a piezoelectric transducer that is connected to it. In particular, the acoustic emitter 16 can include an integrated unit (i.e., an oscillator) which comprises the transducer 18, the plate-like member and electric connections and the like. Therefore, the transducers 18 can be piezoelectric transducers such as electroacoustic transducers that convert electrical charges produced by piezoelectric property of solid materials into mechanical energy.

The transducers 18 can alternatively be magnetostrictive transducers or electromagnetic acoustic transducers that utilize the magnetostrictive property of a material to convert the energy in a magnetic field into mechanical energy. The acoustic emitters 16 can include any other type of acoustic emitter that can emit the necessary soundwaves. In the illustrated embodiment, the oscillation frequency emitted by the transducers 18 are preferably in the range of 20 kiloHertz (kHz) to 1 megaHertz (MHz). More preferably, the oscillation frequency emitted by the transducers 18 are in the range of 25 kHz to 50 kHz.

Referring to FIGS. 2 and 4, the acoustic three assisted painting system 10 of the illustrated embodiment can include a control system 38 programmed to control the components of the housing 12. such as the nozzles 14 and the transducers 18. In particular, the control system 38 can include an electronic controller 40 for controlling the nozzles 14 and transducers 18, either in combination or selectively as will be described below. The electronic controller 40 is preferably a microcomputer that includes one or more processor(s) 42 and one or computer memory device (s) 44.

The memory 44 is any computer storage device or any computer readable medium with the sole exception of a transitory, propagating signal. For example, the memory 44 can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM device, a hard disk, a flash drive, etc. The memory 44 is configured to store settings, programs, data, calculations and/or results of the processor 42(*s*).

Referring to FIGS. 3 and 4, the acoustic emitters 16 can include one or more wireless communication device(s) for communicating with the processor 42 of the electronic controller 40. In particular, the acoustic emitters 16 can receive control signals from the electronic controller 40 via a wireless communication device(s) 46 of the electronic controller 40. The acoustic emitters 16 can each be equipped with a wireless communication device individually to receive control signals from the electronic controller 40. Alternatively, the acoustic emitters 16 can be equipped with a single wireless communication device to collectively receive control signals from the electronic controller 40.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication device can be a one-way wireless communication unit such as a receiver.

The electronic controller 40 can be programmed to control radiation pressure and/or the acoustic frequency emitted by the transducers 18. For example, the electronic controller 40 can be programmed to modulate the acoustic emitters 16 to change the oscillation (e.g. frequency, phase and/or amplitude) of the acoustic forces emitted by the transducers 18. The electronic controller 40 can control the oscillation of the acoustic emitters 16 to modulate acoustic emission upon detection that droplets have formed at the outlets 14B of the nozzles 14 and/or that the droplets have been formed are at a predetermined size.

In view of this, the housing 12 can include one or more detector(s) (not shown) disposed at the nozzles 14 or in the vicinity of the nozzles 14 to detect the presence and size of droplets forming at the outlets 14B of the nozzles 14. The detectors can be any type of sensor as needed and/or appropriate. For example, the detector(s) can utilize thermal imaging or acoustic imaging to measure a size or profile of the droplets. The detectors can be equipped with wireless communication devices to send detection signals to the electronic controller 40.

The memory 44 of the electronic controller 40 can store parameters for the frequencies emitted by the acoustic emitters 16. The memory 44 can be programmed to set these parameters or programmed to pre-store these parameters. For example, the memory 44 can store ranges of modulation frequencies that correspond to detected size(s) of the droplets and/or the distance between the nozzles 14 and the transducers 18. For example, the electronic controller 40 can be programmed to control the acoustic emitters 16 to emit at a higher frequency when the droplets are detected to be greater than a predetermined size to dislodge the droplets.

The electronic controller 40 can also be programmed to control the acoustic emitters 16 to emit at a higher frequency when detected droplets are farther away so that the emitted frequency is sufficient to dislodge the droplets. Alternatively, the electronic controller 40 can also include a timer such that the electronic controller 40 is programmed to control the acoustic emitters 16 to automatically emit pre-determined oscillation frequencies based on pre-set time periods.

Referring to FIGS. 1 and 2, the acoustic three assisted painting system 10 can further include an inspection system for quality insurance of the paint application For example, the inspection includes one or more detectors, such as cameras 48, for detecting the paint that is dispensed from the outlets 24 of the housing 12. As shown, the cameras 48 are preferably disposed on a bottom side of the housing 12 in the vicinity of the outlets 24 of the housing 12. The cameras 48 can utilize thermal imaging or acoustic imaging to measure a size or profile of the droplets that are ejected from the outlets 24 of the housing 12. Additionally, as seen in FIG. 2, the cameras 48 are in electronic communication with the electronic controller 40 via wireless communication device (s). The electronic controller 40 can be programmed to measure a thickness or uniformity of the paint that is applied to the vehicle body based on the information detected by the cameras 48.

Additionally, referring to FIG. 2, the acoustic force assisted painting system 10 can further include heaters 50 that are disposed on the housing 12. The heaters 50 can apply ultraviolet heating to the applied paint to dry the paint via curing. Alternatively, the heaters 50 can apply infrared heating to dry the paint that is applied to the vehicle body.

Figure 6:
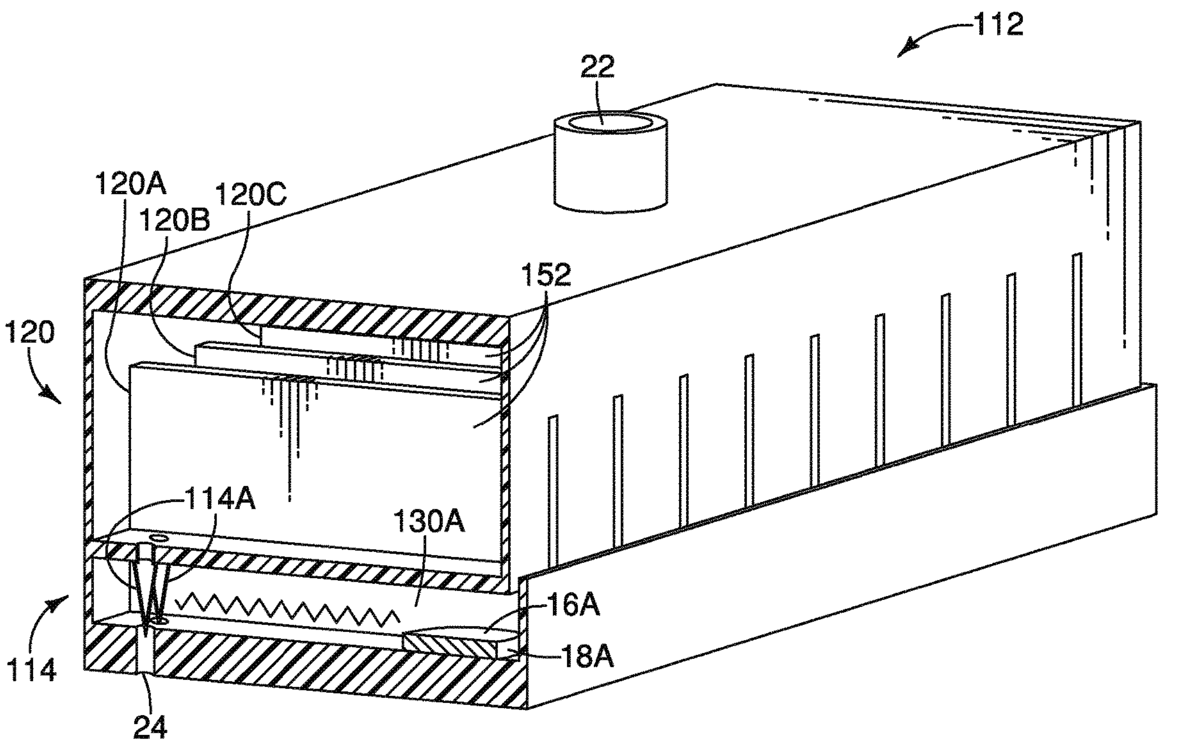
FIG. 6 is a first modified housing that can be implemented with the acoustic force assisted painting system.
Figure 7:
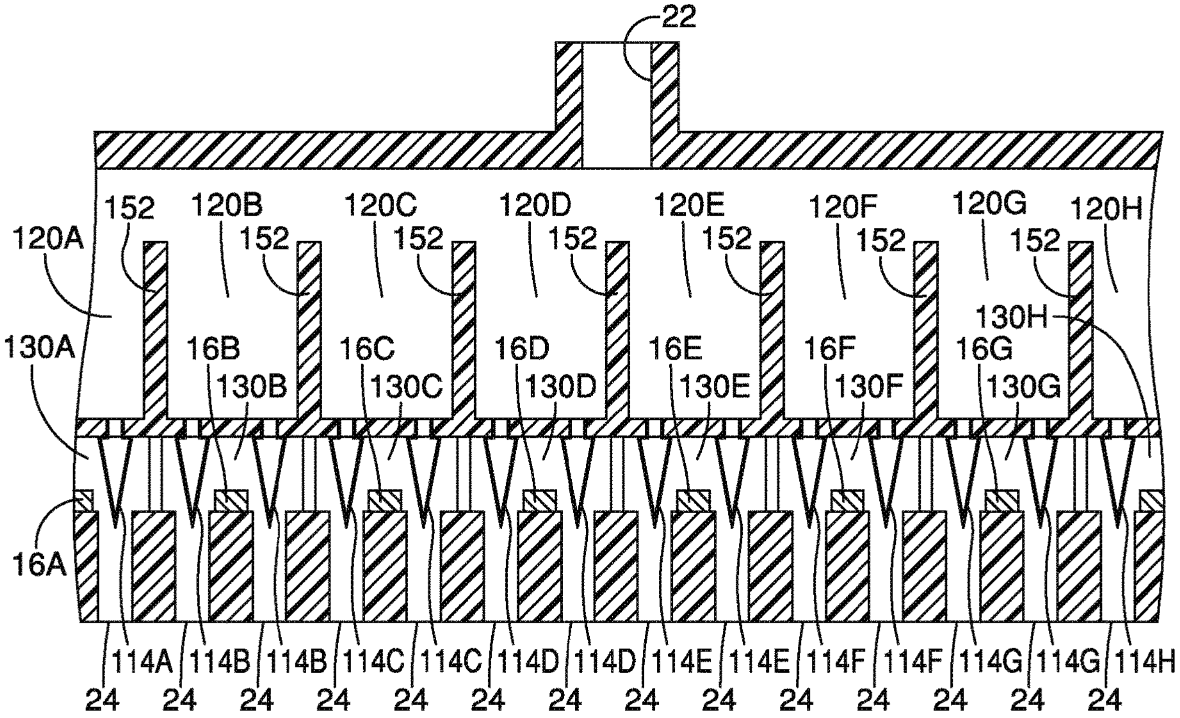
FIG. 7 is a cross sectional view of the first modified housing of FIG. 6.

Referring now to FIGS. 6 and 7, a first modified housing 112 that can be part of the acoustic force assisted painting system 10 is illustrated. As best seen in FIG. 6, the first modified housing 112 includes a reservoir 120 for storing paint. The housing 12 includes a conduit 22 that fluidly receives paint from an external source (not shown) to he stored in the reservoir 120. In the illustrated embodiment, the first modified housing 112 houses a plurality of nozzles 114A-114H and a plurality of acoustic emitters 16A-H that include transducers 18. The first modified housing 112 includes a plurality of acoustic transducers 18. Therefore, the acoustic force assisted painting system 10 of FIGS. 6 and 7 includes the plurality of nozzles 114A-H and the plurality of transducers 18. In other words, the acoustic force assisted painting system 10 is a multi-nozzle system for paint application.

Due to the similarities between the first modified housing 112 and the housing 12, identical components in the first modified housing 112 will receive the same reference numerals as the housing 12. Modified components of the first modified housing 112 will receive the same reference numerals as corresponding components of the housing 12 increased by 100.

The first modified housing 112 further includes a plurality of outlets 24 positioned at an underside surface that is opposite side on the housing 12 with respect to the conduit 22. The paint is dispensed from the outlets 24 to be applied to the vehicle body. The first modified housing 112 further includes an acoustic chamber 130 that Houses the transducers 18. The transducers 18 are disposed in the acoustic chamber 130.

The first modified housing 112 includes a plurality of walls 152 extending from the reservoir 120 to the acoustic chamber 130, The plurality of walls 152 segregate the reservoir 120 into sections to form a plurality of sub-reservoirs 120A-H for storing paint. For example, the sub-reservoirs 120A-H can store different colors of paint or different types of paint. While the first modified housing 112 is illustrated as including a single conduit 22 for receiving paint into the first modified housing 112, it will be apparent to those skilled in the vehicle field from this disclosure that the first modified housing 112 can include a plurality of conduits leading to different sub-reservoirs 120A-H for delivering different colors and/or types of paint to the different sub-reservoirs 120A-H.

As best seen in FIG. 7, each of the sub-reservoirs 120A-H includes a plurality openings that extend into a plurality of first channels 26. The first channels 26 are fluidly connected to the nozzles 114A-H so that paint flows from the reservoir 120 to the nozzles 114A-H. The housing 12 further includes a plurality of second channels 28 that receive paint from the nozzles 114A-H. The second channels 28 include the outlets 24 of the housing 12 that open to the exterior. Therefore, the second channels 28 are fluidly connected to the nozzles 114A-H to receive paint from the reservoir 120.

The plurality of walls 152 also segregate the acoustic chamber 130 into a plurality of acoustic sub-chambers 130A-H. Each of the acoustic sub-chambers 130A-H includes some of the nozzles 114A-H extending therethrough. For example, as shown in FIG. 7, a first acoustic sub-chamber 130A includes a pair of first nozzles 114A passing therethrough to receive and dispense paint from a first sub-reservoir 120A. A second acoustic sub-chamber 130B includes a pair of second nozzles 114B passing therethrough to receive and dispense paint from a second sub-reservoir 120B.

As stated, the first and second sub-reservoirs 120A-H can store different colored paints. Therefore, the first and second nozzles 114A and 114B will dispense different colored paints with respect to each other. While the sub acoustic-chambers are each illustrated as having a pair of nozzles 114A-H, it will he apparent to those skilled in the vehicle field from this disclosure that the number of nozzles 114A-H extending in each acoustic sub-chamber can vary as needed and/or desired.

in the illustrated embodiment, each of the acoustic sub-chambers 130A-H includes a single acoustic emitter 16 disposed therein. As seen in FIG. 7, the plurality of acoustic emitters 16 are arranged in successive rows along the acoustic chamber 130. Each of the acoustic emitters 16 correspond to more than one of the successive rows of the nozzles 114. That is, each of the acoustic emitters 16 emit acoustic force for more than one nozzle 114 in each of the acoustic sub-chambers 130A-H. For example, as seen in FIG. 7, a first acoustic emitter 16A of the acoustic emitters 16 emits acoustic force to the first nozzles 114A in the first acoustic sub-chamber 130A. A second acoustic emitter 16B of the acoustic emitters 16 emits acoustic force to the second nozzles 114B in the second acoustic sub-chamber 130B.

As seen in FIGS. 6 and 7, each of the acoustic sub-chambers 130A-H includes an upstream side wall and a downstream side wall. The preferably, the downstream side wall of the acoustic sub-chambers 130A-H includes the acoustic emitters 16 disposed thereon. However, it will be apparent to those skilled in the vehicle field from this disclosure that the acoustic emitters 16 can be disposed on any other one of the side walls of the acoustic sub-chambers 130A-H.

In the acoustic force assisted painting system having the first modified housing 112, the first modified housing 112 can be implemented with the control system having the electronic controller 40. That is, the electronic controller 40 can be programmed to control the nozzles 114A-H and/or the transducers 16 of the first modified housing 112, either in combination or selectively. Preferably, the nozzles 114 of the first modified housing 112 can be equipped with a wireless communication device 146 to collectively receive control signals from the electronic controller 40 (such as a wireless communication device 146 illustrated schematically in FIG. 2). Alternatively, each of the nozzles 114A-114H can be equipped with a wireless communication device 146. The nozzles 114A-114H in each of the acoustic sub-chambers 130A-H can be equipped with a respective wireless communication device 146 for communicating with the electronic controller 40.

For example, as seen in FIG. 7, the electronic controller 40 can send a control signal to a wireless communicator for the first acoustic sub-chamber 130A so that the first nozzles 114A dispense paint from the first sub-reservoir 120 to dispense paint of a first color. The electronic controller 40 can send another control signal to a wireless communicator for the second acoustic sub-chamber 130B so that the second nozzles 114B dispense paint from the second sub-reservoir 120 to dispense paint of a second color that is different from the first color. The electronic controller 40 can similarly send control signal(s) to the control the other nozzles 114C-H of the first modified housing 112 to dispense different colored paint either individually or in conjunction.

Figure 8:
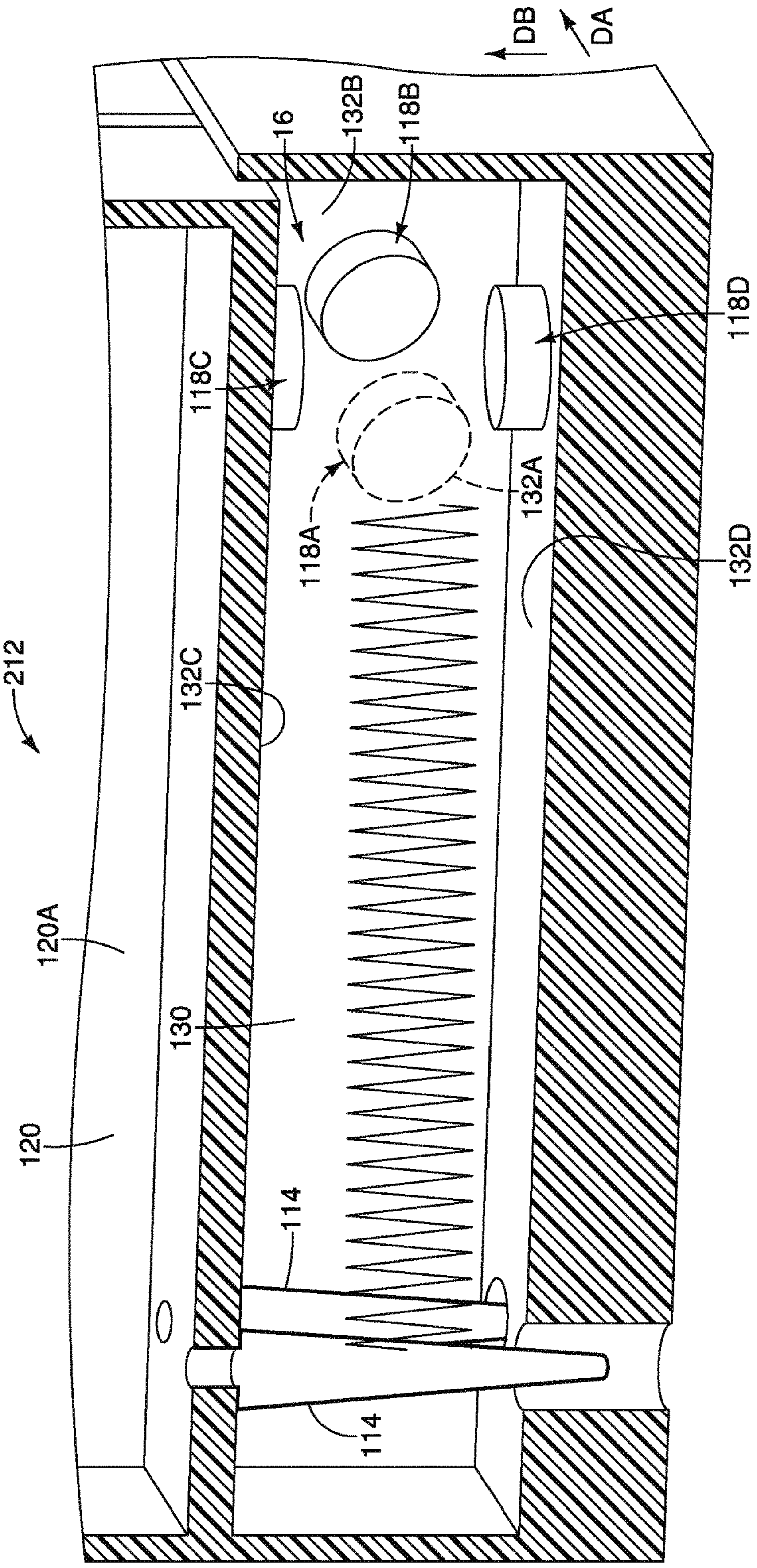
FIG. 8 is a cross sectional view of a second modified housing that can be implemented with the acoustic force assisted painting system.

Referring now to FIG. 8, a second modified housing 212 that can be part of the acoustic force assisted painting system 10 is illustrated. The second modified housing 212 includes a reservoir 20 and an acoustic chamber 130 that is substantially identical to the reservoir 20 and the acoustic chamber 130 of the first modified housing 112. The second modified housing 212 houses a plurality of nozzles 114 and a plurality of acoustic emitters that include transducers 118A-D. Therefore the second modified housing 212 includes a plurality of acoustic transducers 118A-D that are housed in the acoustic chamber 130. Therefore, the acoustic force assisted painting system 10 of FIG. 8 includes the plurality of nozzles 114 and the plurality of transducers 118A-D. In other words, the acoustic force assisted painting system 10 is a multi-nozzle system for paint application.

The second modified housing 212 includes a plurality of walls that segregates the reservoir 20 into sections to form a plurality of sub-reservoirs (one sub-reservoir 20 shown) for storing paint in a similar manner as disclosed for the first modified housing 112. The sub-reservoirs 20 can store different colors of paint or different types of paint. The plurality of walls also segregate the acoustic chamber into a plurality of acoustic sub-chambers (one acoustic chamber 130 shown) in a similar manner as disclosed for the first modified housing 112. Each of the acoustic sub-chambers includes the nozzles 114 extending therethrough.

The second modified housing 212 is identical to the first modified housing 112 except that the each of the acoustic sub-chambers includes more than one acoustic emitter (e.g., transducers 118A-D) disposed therein. Due to the similarities between the second modified housing 212 and the first modified housing 112, identical components in the second modified housing 212 will receive the same reference numerals as the first modified housing 112. Modified components of the second modified housing 212 will receive the same reference numerals as corresponding components of the first modified housing 112 increased by 100.

As shown in FIG. 8. the acoustic sub-chamber 130 includes the transducers 118A-D. The acoustic sub-chamber 130 includes an upstream side wall 132C and a downstream side wall 132D. The acoustic sub-chamber 130 includes a pair of lateral side walls 132A and 132B that connect the upstream side wall 132C and the downstream side wall 132D. In the second modified housing 212, the second modified housing 212 includes a first transducer 118A disposed on the lateral side wall 132A, and a second transducer 118B disposed on the lateral side wall 132B. The second modified housing 212 includes a third transducer 1180 disposed on the upstream side wall 132C and a fourth transducer 118D disposed on the downstream side wall 132D.

As shown, each of the transducers 118A-D are arranged on the lateral sidewalls 132A and 132B and the upstream and downstream walls 132C and 132D at 90 degree angles with respect to each other. That is, the first transducer 118A is arranged at a 90 degree angle with respect to the third and fourth transducers 118C and 118D. The second transducer 118B is arranged at a 90 degree angle with respect to the third and fourth transducers 118C and 118D The first and second transducers 118A and 118B overlap in a first direction DA. The third and fourth transducer 118C and 118D overlap in a second direction DB. The first and second directions DA and DB are transverse with respect to each other.

Therefore, the acoustic sub-chamber of the second modified housing 212 includes first, second, third and fourth transducers 118A-D that collectively emit a standing wave to generate a uniform acoustic pressure distribution along travel path. When this acoustic wave travels through the acoustic sub-chamber 130, acoustic pressure increases around the nozzles 114. Therefore, when the nozzles 114 are spaced from the transducer(s) 118A-D by an increased distance such as shown in FIG. 8, it will be apparent to those skilled in the vehicle field from this disclosure that additional transducers 118A-D can be provided to amplify the acoustic pressure applied to the nozzles 114 as illustrated. It will be apparent to those skilled in the vehicle field from this disclosure that each of the acoustic sub-chambers of the second modified housing 212 can include the same type of arrangement of the transducers 118A-D as that shown in FIG. 8.

Figure 9:
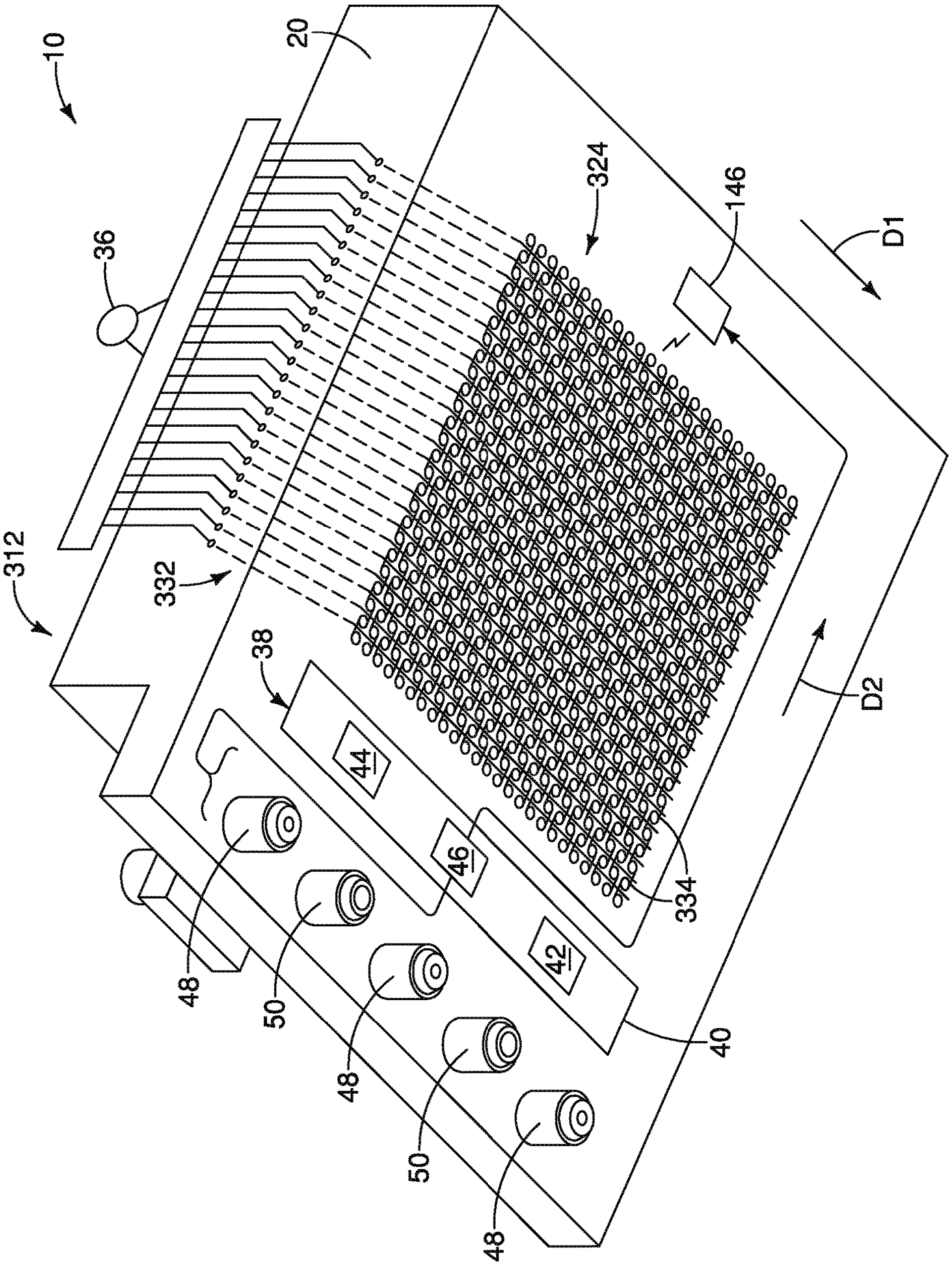
FIG. 9 is a perspective view of an underside of a third modified housing that can be implemented with the acoustic three assisted painting system.
Figure 10:
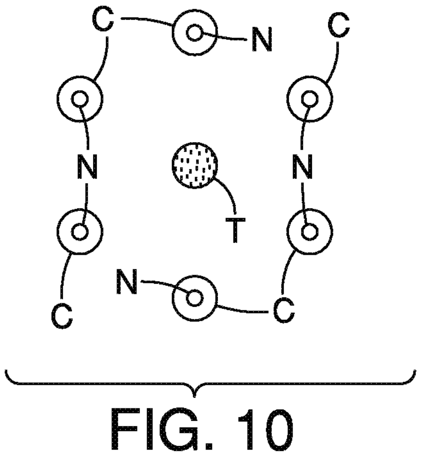
FIG. 10 is a schematic view of an array of nozzles that can he implemented with any of the housings of FIGS. 1 through 9.
Figure 11:
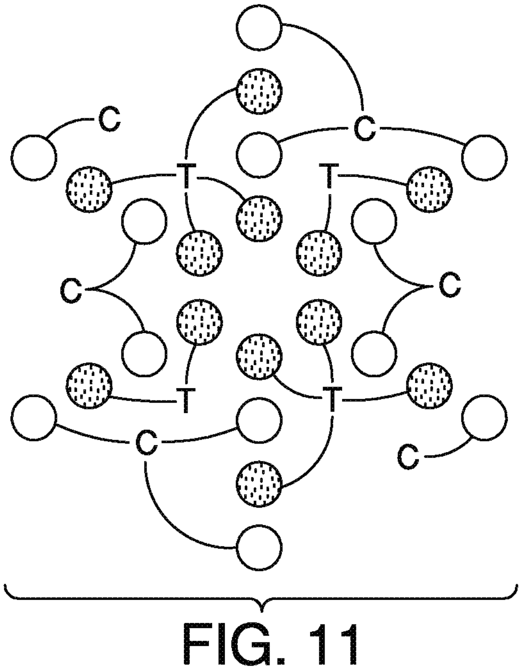
FIG. 11 is another schematic view of an array of nozzles that can be implemented with any of the housings of FIGS. 1 through 9.
Figure 12:
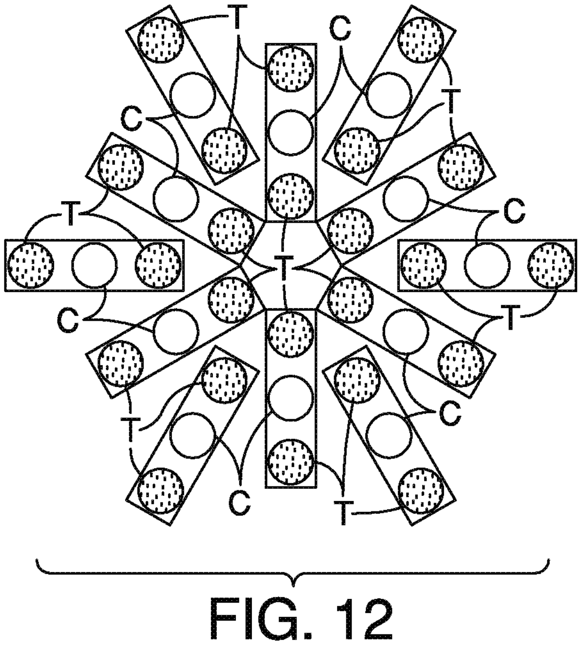
FIG. 12 is another schematic view of an array of nozzles that can be implemented with any of the housings of FIGS. 1 through 9.
Figure 13:
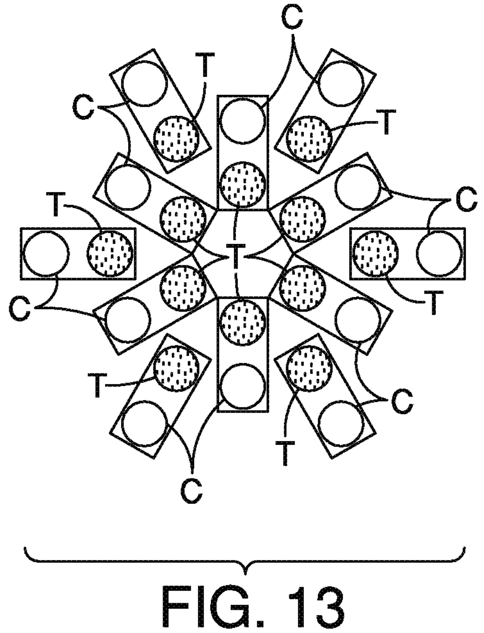
FIG. 13 is another schematic view of an array of nozzles that can be implemented with any of the housings of FIGS. 1 through 9.
Figure 14:
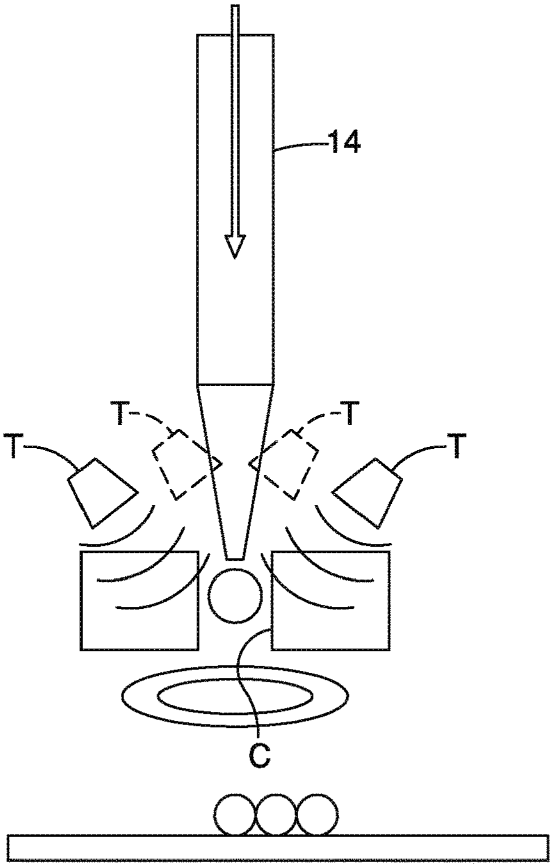
FIG. 14 is a single-nozzle system that can be implemented with any of the housings illustrated in FIGS. 1 through 9.
Figure 15:
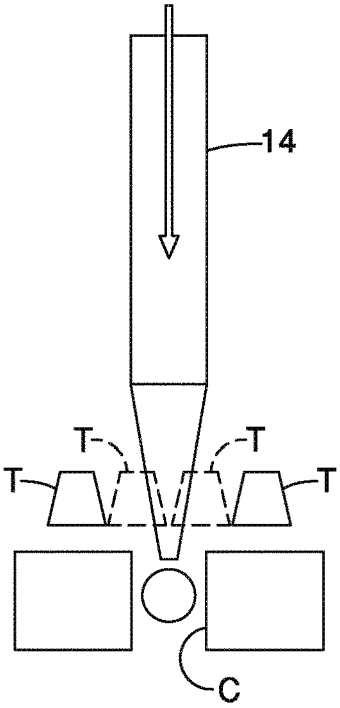
FIG. 15 is another single-nozzle system that can be implemented with any of the housings illustrated in FIGS. 1 through 9.
Figure 16:
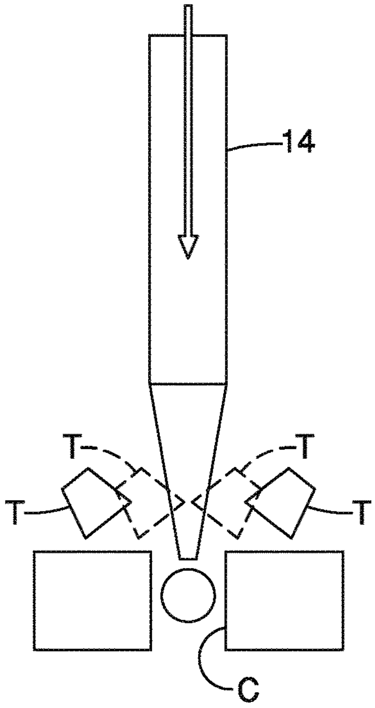
FIG. 16 is another single-nozzle system that can be implemented with any of the housings illustrated in FIGS. 1 through 9.
Figure 17:
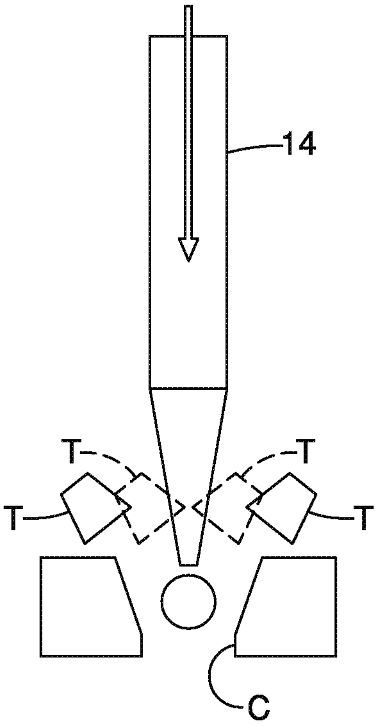
FIG. 17 is another single-nozzle system that can he implemented with any of the housings illustrated in FIGS. 1 through 9.
Figure 18:
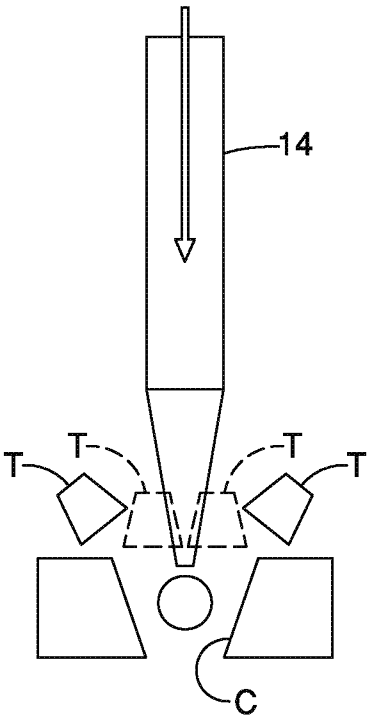
FIG. 18 is another single-nozzle system that can be implemented with any of the housings illustrated in FIGS. 1 through 9.
Figure 19:
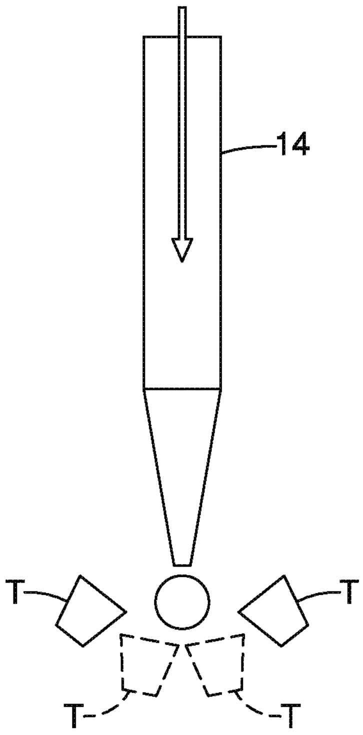
FIG. 19 is another single-nozzle system that can be implemented with any of the housings illustrated in FIGS. 1 through 9.
Figure 20:
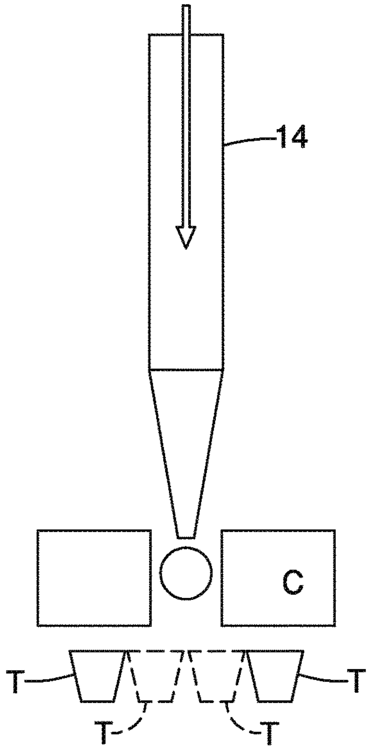
FIG. 20 is another single-nozzle system that can be implemented with any of the housings illustrated in FIGS. 1 through 9.
Figure 21:
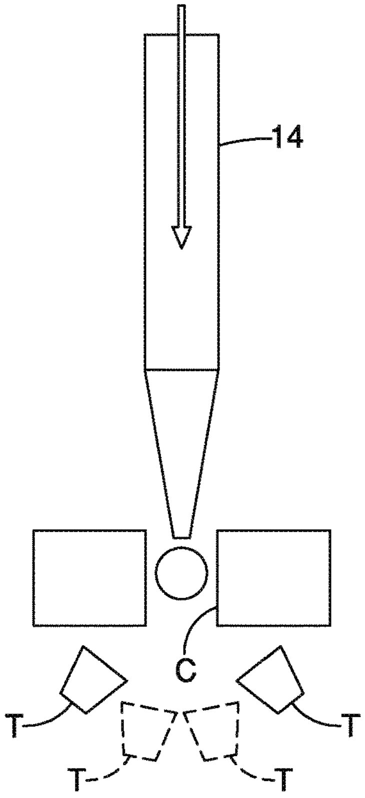
FIG. 21 is another single-nozzle system that can he implemented with any of the housings illustrated in FIGS. 1 through 9.
Figure 22:
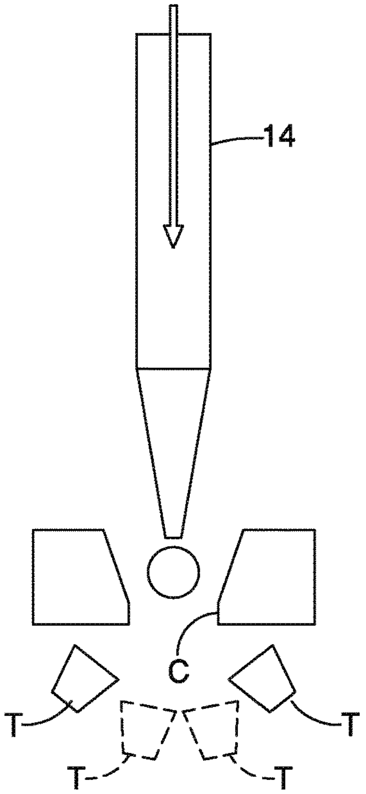
FIG. 22 is another single-nozzle system that can he implemented with any of the housings illustrated in FIGS. 1 through 9.
Figure 23:
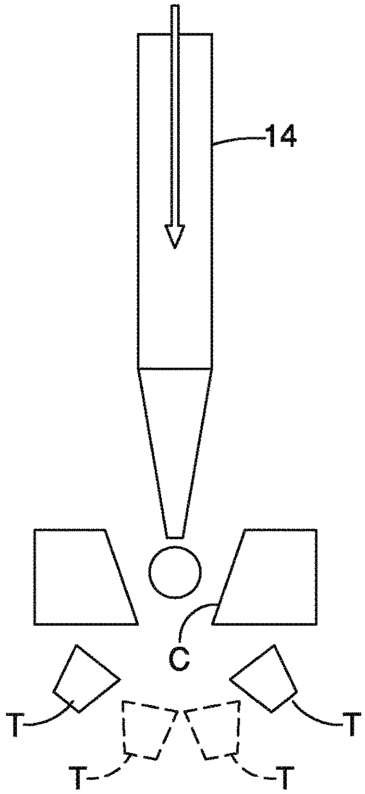
FIG. 23 is another single-nozzle system that can be implemented with any of the housings illustrated in FIGS. 1 through 9.

Referring now to FIG. 9, a third modified housing 312 that can he part of the acoustic force assisted painting system 10 is illustrated. The second modified housing 312 is basically identical to the housing 12 of FIGS. 1 to 5 but the first and second air flow channels 30 and 32 have been modified to be modified first and second airflow channels 330 and 332. The housing 312 includes outlets 324 that corresponds to the modified first and second airflow channels 330 and 332. The arrangement of the modified first and second airflow channels 330 and 332 together provides airflow to form a vortex at the outlets 14A and/or the second channels 28 so to form a downward force that pushes the droplets downward.

The modified first and second airflow channels 330 and 332, as well as the outlets 324 can also be implemented with the first modified housing 112 of FIGS. 6 and 7. The modified first and second airflow channels 330 and 332, as well as the outlets 324 can also be implemented with the second modified housing 212 of FIG. 8. Therefore, it will be apparent to those skilled in the vehicle field from this disclosure that first and second modified housings 112 and 212 can be modified to include the modified first and second airflow channels 330 and 332, as well as the outlets 324 described in FIG. 9.

Due to the similarities between the third modified housing 312 and the housing 12, identical components in the third modified housing 312 will receive the same reference numerals as the housing 12. Modified components of the third modified housing 312 will receive the same reference numerals as corresponding components of the housing 12 increased by 300.

Referring now to FIGS. 10 to 13, examples arrays of nozzles N that can be implemented with any of the housings 12, 112, 212 and 312 of FIGS. 1 through 9 are illustrated. In particular, the nozzles N each extend in a respective channel C and are arranged radially around one or more acoustic emitters that are transducers T, as shown in these features. It will be apparent to those skilled in the vehicle field from this disclosure that the arrangement of the nozzles N with respect to the transducers T can be implemented with any of the housings 12, 112, 212 and 312 of FIGS. 1 through 9. Therefore, it will be apparent to those skilled in the vehicle field from this disclosure that any of the housings 12, 112, 212 and 312 can be modified to include the arrangement of nozzles N, channels C and transducers T as shown herein.

Referring to FIGS. 14 to 23, examples of single-nozzle painting systems that can be implemented with any one of the housings 12, 112, 212 and 312 are illustrated. For example, the housing 12 can be modified to include any one of the single nozzle painting systems of FIGS. 14 to 23. Similarly, the first, second and third modified housings 112, 212 and 312 can he modified to include any one of the single nozzles 14 of FIGS. 14 to 23. Each of the single-nozzle painting systems includes a plurality of transducers T that are arranged in a 360 degree array around the outlets of the nozzles 14. With the arrangement of the transducers T, the transducers T collectively emit acoustic forces to the nozzles 14 at a 360 degree arrangement around the nozzles 14. In this way, the transducers T together apply an angular momentum to the droplets that can spin the droplets that are ejected by the nozzles 14 in order to improve dispensing accuracy and speed.

Referring to FIGS. 17-29, 22 and 23 specifically, modifications of the second channels C that can be implemented with any one of the housings 12, 112, 212 and 312 are illustrated. Therefore, the second channels 28 of any one of the housings 12, 112, 212 and 312 can be modified to have different shapes as shown. It will be apparent to those skilled in the vehicle field from this disclosure that the second channels 28 of any of the housings 12, 112, 212 and 312 can be modified to have different shapes and to help improve the application of the droplets, as shown in FIGS. 17-29, 22 and 23.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” or “element” when used in the singular can have the dual meaning of a single part or a plurality of parts.

The term “detect” as used herein to describe an operation or function carried out by a component, a section, a device or the like includes a component, a section, a device or the like that does not require physical detection, but rather includes determining, measuring, modeling, predicting or computing, or the like to carry out the operation or function.

The term “configured” as used herein to describe a component, section or part of a device includes hardware and/or software that is constructed and/or programmed to carry out the desired function.

The terms of degree such as “substantially”, “about” and “approximately” as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An acoustic force assisted painting system comprising:

a housing having a conduit for receiving paint from an external source into the housing, the housing having at least one acoustic chamber having at plurality of side walls defining an open space of the at least one acoustic chamber;

at least one nozzle disposed in the housing, the at least one nozzle having an inlet that is fluidly connected to the conduit to receive paint from the conduit, the at least one nozzle having an outlet that dispenses paint; and at least one acoustic emitter supported on at least one side wall of the plurality of sidewalls at a location downstream of the inlet with respect to the conduit, the at least one acoustic emitter being configured to emit an acoustic force from the at least one acoustic chamber past the open space towards the nozzle;

wherein the at least one acoustic emitter is positioned closer to the outlet than to the inlet of the at least one nozzle;

wherein the at least one nozzle includes a plurality of nozzles, each of the plurality of nozzles having a respective inlet that is fluidly connected to the conduit that receives paint;

wherein the plurality of nozzles extends through the open space of the acoustic chamber;

wherein the acoustic chamber includes an upstream side wall and a downstream side wall, the downstream side wall being positioned closer to respective outlets of the plurality of nozzles than to the respective inlets, and the at least one acoustic emitter being positioned on the downstream side wall;

wherein the downstream side wall of the acoustic chamber includes a plurality of openings, each of the openings receiving one of the outlets of the plurality of nozzles;

wherein each of the plurality of openings extend into a plurality of channels that each open to an exterior of the housing.

2. The acoustic force assisted painting system according to claim 1, wherein the plurality of nozzles are arranged in an array of successive rows and columns within the housing.

3. The acoustic force assisted painting system according to claim 2, wherein the at least one acoustic emitter includes a plurality of acoustic emitters arranged in successive rows in the acoustic chamber, each of the acoustic emitters corresponding to one of the successive rows of the nozzles.

4. The acoustic force assisted painting system according to claim 2, wherein the at least one acoustic emitter includes a plurality of acoustic emitters arranged in successive rows in the acoustic chamber, each of the acoustic emitters corresponding to more than one of the successive rows of the nozzles.

5. The acoustic force assisted painting system according to claim 4, wherein the housing includes a paint reservoir that receives paint from the conduit, the housing further including a plurality of walls extending from the paint reservoir to the acoustic chambers, the plurality of walls forming a plurality of sub-reservoirs for storing paint and a plurality of acoustic sub-chamber.

6. The acoustic force assisted painting system according to claim 5, wherein each of the acoustic sub-chamber includes a plurality of nozzles extending therethrough.

7. The acoustic force assisted painting system according to claim 6, wherein each of the acoustic sub-chamber includes a single acoustic emitter of the plurality of acoustic emitters.

8. The acoustic force assisted painting system according to claim 6, wherein each of the acoustic sub-chamber includes more than one acoustic emitter of the plurality of acoustic emitters.

9. The acoustic force assisted painting system according to claim 8, wherein each of the acoustic sub-chamber includes four acoustic emitters arranged to be separated by 90 degree angles.

10. The acoustic force assisted painting system according to claim 1, wherein the at least one acoustic emitter is positioned upstream of the outlets at a location within the vicinity of the outlets.

11. The acoustic force assisted painting system according to claim 10, wherein the at least one acoustic emitter includes an acoustic transducer.

12. The acoustic force assisted painting system according to claim 3, wherein the plurality of acoustic emitters includes a plurality of acoustic transducers.

13. The acoustic force assisted painting system according to claim 1, wherein the housing includes a first airflow channel extending through the plurality of channels in a first direction to enable external air to flow through the plurality of channels in the first direction, and the housing includes a second airflow channel extending through the plurality of channels in a second direction that is transverse to the first direction to enable external air to flow in the second direction.

14. The acoustic force assisted painting system according to claim 1, wherein the at least one acoustic transmitter is spaced from the at least one nozzle.

* * * * *